United States Patent [19]
Pauwels et al.

[11] Patent Number: 6,002,992
[45] Date of Patent: Dec. 14, 1999

[54] TEST SYSTEM FOR VERIFYING ANGLE/TIME BASED SYSTEMS AND METHOD THEREFOR

[75] Inventors: Mike Pauwels; Richard Soja; Chad Peckham, all of Austin, Tex.

[73] Assignee: Motorola Inc, Austin, Tex.

[21] Appl. No.: 08/876,460

[22] Filed: Jun. 16, 1997

[51] Int. Cl.$^6$ .......................... G06F 9/455; G06F 11/263
[52] U.S. Cl. ................ 702/123; 702/186; 395/500.28; 714/38
[58] Field of Search .................... 702/123, 183, 702/182, 185, 186; 714/38, 47; 395/500.28

[56] References Cited

U.S. PATENT DOCUMENTS

| | | | |
|---|---|---|---|
| 4,116,052 | 9/1978 | Paluka | 73/117.3 |
| 5,119,381 | 6/1992 | Yamamoto | 371/62 |
| 5,541,862 | 7/1996 | Bright et al. | 364/580 |
| 5,905,856 | 5/1999 | Ottensooser | 395/183.14 |

*Primary Examiner*—Patrick Assouad
*Attorney, Agent, or Firm*—Daniel D. Hill

[57] ABSTRACT

A test system (10) for testing real-time angle/time based control systems includes a digital signal generator (16), a multi-channel pulse analyzer (22), and a test system host (12). The test system host (12) controls the execution of a user generated test script. The script specifies test stimuli, external angle/time event interrupts for use by the digital signal generator (16) to a device under test (DUT) (20), and angle/time triggers used by the analyzer (22) to test the DUT (20). Using the test stimuli and external angle/time event interrupts, the DUT (20) is exercised to determine whether or not the DUT (20) and corresponding control system software operate properly. Output data from the DUT (20) are monitored by the pulse analyzer (22), which records the output data based on information specified in the script. Test results are then retrieved by the test system host (12).

17 Claims, 4 Drawing Sheets

TEST SYSTEM FOR VERIFYING ANGLE/ TIME BASED SYSTEMS AND METHOD THEREFOR

FIELD OF THE INVENTION

The present invention relates generally to test systems, and more particularly, to a test system for verifying angle/ time based systems and method therefor.

BACKGROUND OF THE INVENTION

Data processing systems used for complex real-time control of rotating machine applications, such as engine and robotic control systems, continually require more precise control, faster response, and more input/output (I/O) capability. As a result, the need for improved data processing by a data processing system has grown significantly in recent years. While modern microprocessors and microcontrollers have been able to accommodate these increased performance needs, the ability to provide real-time test coverage for these integrated circuit devices and the software they contain has not been accommodated.

For example, a modern engine control system, such as for controlling the operation of an automobile engine, performs such functions as monitoring the current location, speed, and acceleration of a crank shaft or cam, controlling fuel injection into each cylinder by starting and stopping fuel pulses at precise times, and controlling spark plugs for each cylinder by providing a spark pulse of a precisely controlled given duration.

An engine cycle is the number of crank shaft rotations that occur from one spark plug firing to the next. In a four stroke engine having four cylinders, this would be two complete revolutions of the crank shaft. Given a maximum engine speed of approximately one hundred revolutions per second, a total of fifty engine cycles would be processed in one second. Therefore, each engine cycle would take approximately twenty milliseconds. During this twenty millisecond time it would be necessary for the microcontroller to detect seventy-two teeth marking the location of the crank shaft, and perform certain tasks, such as, turning the fuel injectors on and off for four cylinders at the correct time for the correct amount of time, and turning on and off four spark plugs at the precise time. In a typical automobile engine, just these basic engine control functions result in the detection and control of over 4400 events in just one-second. In addition to these basic functions, many other synchronous and asynchronous events need to be handled. It would be prohibitively expensive and time consuming to test all combinations and permutations of the synchronous and asynchronous signals necessary to control the engine relative to each other. For example, if desirable to determine how a specific asynchronous event effects performance during an acceleration period that lasts as short as 10 seconds, in would be necessary to perform an interrupt repeatedly between the beginning of the acceleration cycle and the end of the acceleration cycle in order to assure accurate test coverage.

Current testing of such real-time angle based systems is difficult and requires manual setup, execution, and analysis of testing vectors. The amount of time taken to perform each individual test can be relatively long because testing of as many data points as possible is desirable in order to implement a near real-time analysis. For example, in order for a test engineer to devise the appropriate setup to provide a system the appropriate stimulus, execute the stimulus, obtain results and analyze them, can take several hours for a single test point. Analyzing a minimal set of points to simulate real time, as discussed above, can require thousands of individual tests requiring thousands of hours. Also, because of the complexity of today's real-time angle/time based systems, testing must be at an application, or system, level, with a large number of test cases. In addition, testing must be performed in real time, including dynamic test cases, and must be repeatable and quantifiable.

Therefore, it would be desirable for an automated test system for verifying real-time angle/time based systems that allowed for efficient setup, execution and analysis of test stimuli.

DESCRIPTION OF A PREFERRED EMBODIMENT

Generally, the present invention provides a test system that controls the execution of a user generated test script for testing complex real-time angle/time event based rotating machine control systems. The script specifies test stimuli, external angle/time event interrupts, and analyzer angle/time triggers used to test a device under test (DUT). The test system host's test executive generates digital signal generator instructions. Based on the test stimuli and external angle/time event interrupts, the DUT is exercised to determine whether or not the driver system on the DUT is operating properly. The outputs of the (DUT) are monitored by a multi-channel pulse analyzer. The pulse analyzer records information based on information specified in the script and provided by the test system host. CPU (central processing unit) monitor code is specified by the script, and provided by the test system host to monitor and record specific event information. Test results are retrieved by the test system host and analyzed.

The test system provides automated real-time testing of angle/time based systems having the advantage of shortening test setup time because many of the tasks are automated, greatly reducing total test time. Thus, a large number of test cases can be setup relatively quickly, allowing shorter test times with results that are repeatable and quantifiable.

The present invention can be more fully described with reference to FIGS. 1–4. The term "bus" will be used to refer to a plurality of signals or conductors which may be used to transfer one or more various types of information, such as data, addresses, control, or status. The terms "assert" and "negate" will be used when referring to the rendering of a signal, status bit, integrated circuit pin, or similar apparatus into its logically true or logically false state, respectively. If the logically true state is a logic level one, the logically false state will be a logic level zero. And if the logically true state is a logic level zero, the logically false state will be a logic level one.

Figure 1:
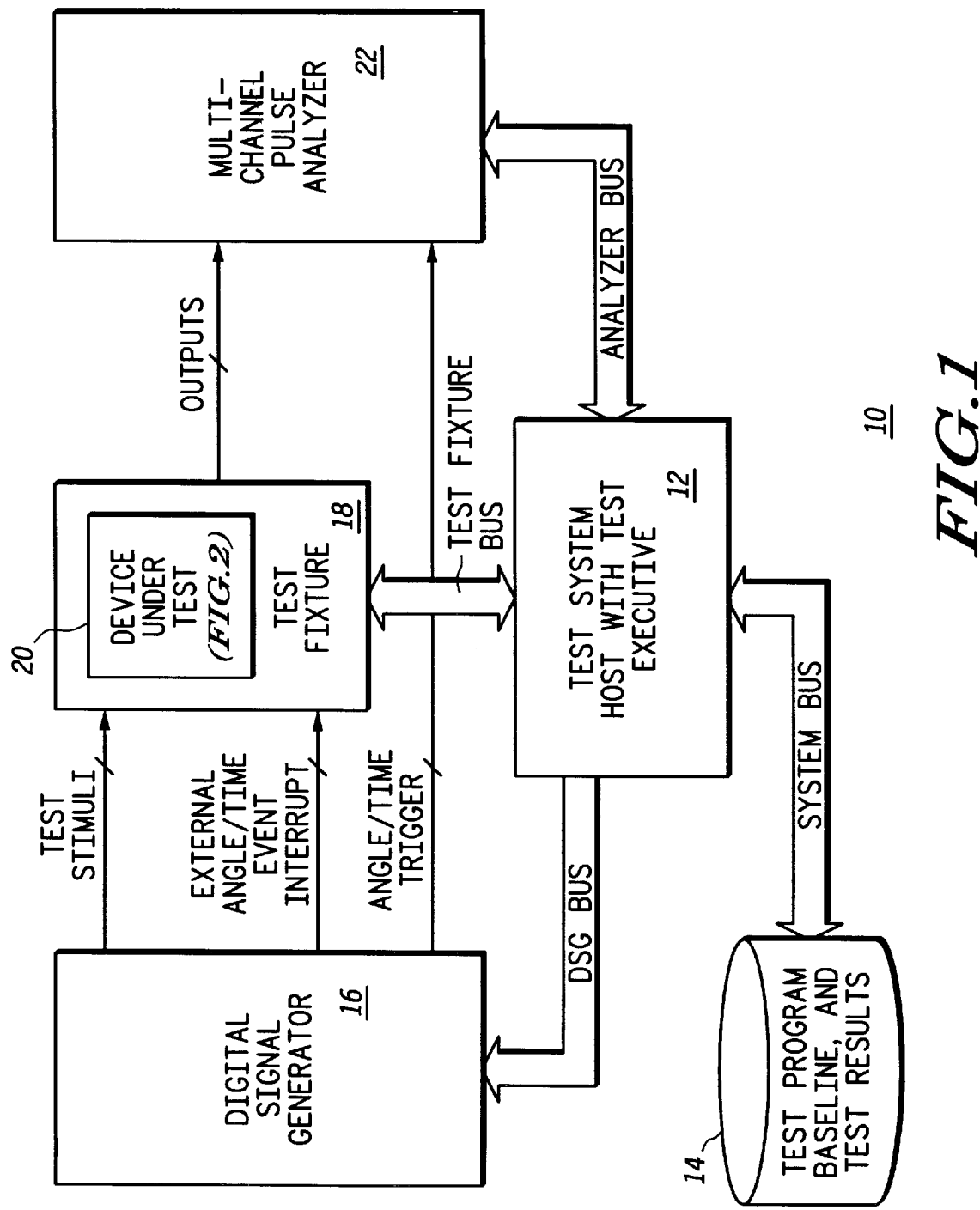
FIG. 1 illustrates, in block diagram form, an automated test system for the real-time testing of angle/time based control systems in accordance with the present invention.

FIG. 1 illustrates a test system comprising a digital signal generator (DSG) 16, a test fixture 18, a multi-channel pulse analyzer 22, a test system host 12, and a memory 14. The test system 12 is connected to a unidirectional DSG bus, and connected bidirectionally to a test fixture bus, analyzer bus, and system bus. The digital signal generator 16 is connected to the test fixture 18 for transmitting, via unidirectional busses, test stimuli, external angle/time interrupts, and angle/time triggers. The test fixture 18 is bidirectionally connected to test system host 12 via the test fixture bus, and has unidirectional DUT outputs for providing output information. The pulse analyzer 22 is unidirectionally connected the DSG 16 to receive the angle/time trigger information. Also, the pulse analyzer 22 is coupled to the test fixture 18 to receive outputs from the device under test (DUT). In addition, pulse analyzer 22 is bidirectionally connected to the test system host 12 via the analyzer bus. The memory 14 is bidirectionally connected to the test system host 12 via the system bus.

Figure 2:
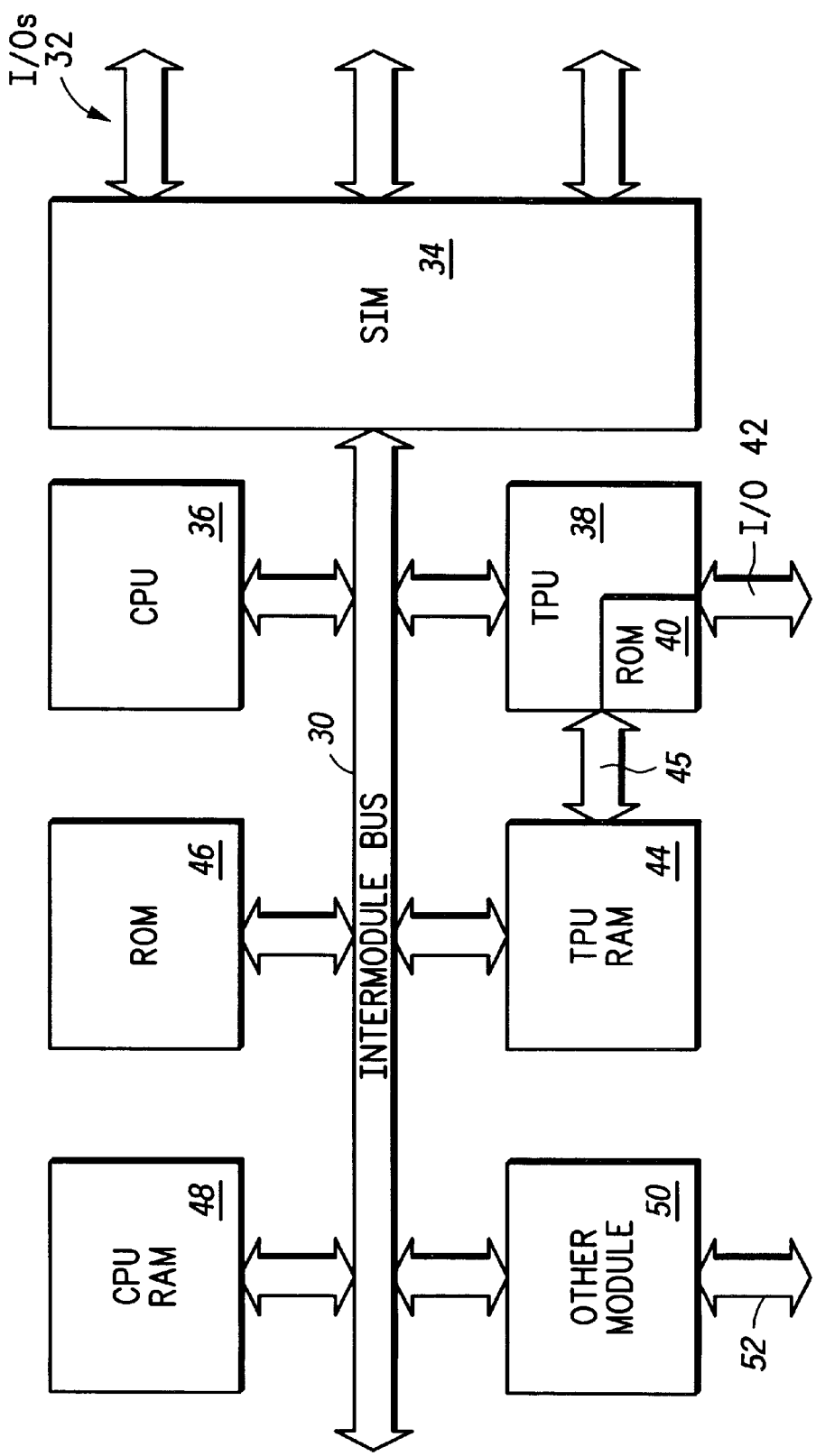
FIG. 2 illustrates, in block diagram form, one embodiment of an integrated circuit device under test in the system of FIG. 1.

One embodiment of the DUT 20 is illustrated in FIG. 2 and is generally an integrated circuit having a central processing unit (CPU) random access memory (RAM) 48, a read only memory (ROM) 46, a CPU 36, other module 50, time processing unit (TPU) RAM 44, TPU 38, system interface module (SIM) 34, input/output (I/O) terminals 32, I/O terminals 42 and 52, an intermodule bus 30, and a TPU ram bus 45. The intermodule bus 30 is bidirectionally coupled to each of the CPU RAM 48, ROM 46, CPU 36, SIM module 34, TPU 38, TPU RAM 44 and other module 50. The module are allowed to communicate and pass data via the intermodule bus 30. I/O terminals 32 are connected to the SIM module to provide bidirectional communication external to the integrated circuit. I/O terminals 42 are connected to the TPU module to provide bidirectional communication external to the integrated circuit. I/O terminals 42 are analogous to the DUT outputs of FIG. 1. I/O terminals 52 are connected to the other module 50 to provide bidirectional communication external to the DUT 20.

The illustrated angle/time based system of FIG. 2 is capable of receiving angle and time based information through I/O terminals 42. For example, a pulse train generated by teeth on a rotating crankshaft would be received via the I/O terminals 42. Based on this information, a system driver, via the TPU, can determine angle information for the crank shaft, as well as location and delay information relative to a specific location within an engine cycle based on the crank shaft position. The system driver implements predefined calls for a specific application. The system driver for an engine control application would include the microcode for the TPU 38 and a low-level CPU driver. The microcode for the TPU can reside in the TPU ROM 40, or the TPU RAM. In one embodiment, only one of the TPU RAM 44 and the TPU ROM 40 can be accessed by the TPU at a given time. The low level CPU driver can reside in CPU RAM 48, ROM 46, or other available memory location. The low-level CPU driver interfaces with the TPU to provide predetermined functions or calls. Higher levels of code within the DUT 20 can include high-level drivers, operating systems, and application specific code.

The test system 10, of FIG. 1, is specifically devised to test an angle/time based system efficiently. In such a system it is necessary to provide and monitor rotating machine timing, such as would be generated by an internal combustion engine. The DUT 20 is generally a microcontroller capable of controlling the angle/time based system. Specifically, the invention is conceived to solve a problem relating to testing an internal combustion engine based control system, but the invention would be used for testing a variety of systems such as motors, robotics, transmissions, and manufacturing tools that require motor control when the position of the motor as referenced by angles is important.

In an actual application, such as engine control for an automotive application, the DUT 20 would contain multiple levels of code which need to be verified. For example, the DUT containing a TPU would have TPU microcode and low level CPU drivers which form the system driver to be tested.

At a next level, a high level driver implementing user-specific functions in the CPU code can exist. Next, an operating system can reside for executing an application layer of software. Generally, each layer of code is provided by different suppliers. As a result, it is necessary for developers of low level functions, such as a system driver to develop methods of testing their code without knowledge of the actual application. Therefore, it is necessary for a system driver provider to comprehensively test an adequate number of potential driver combinations to assure functionality.

Figure 3:
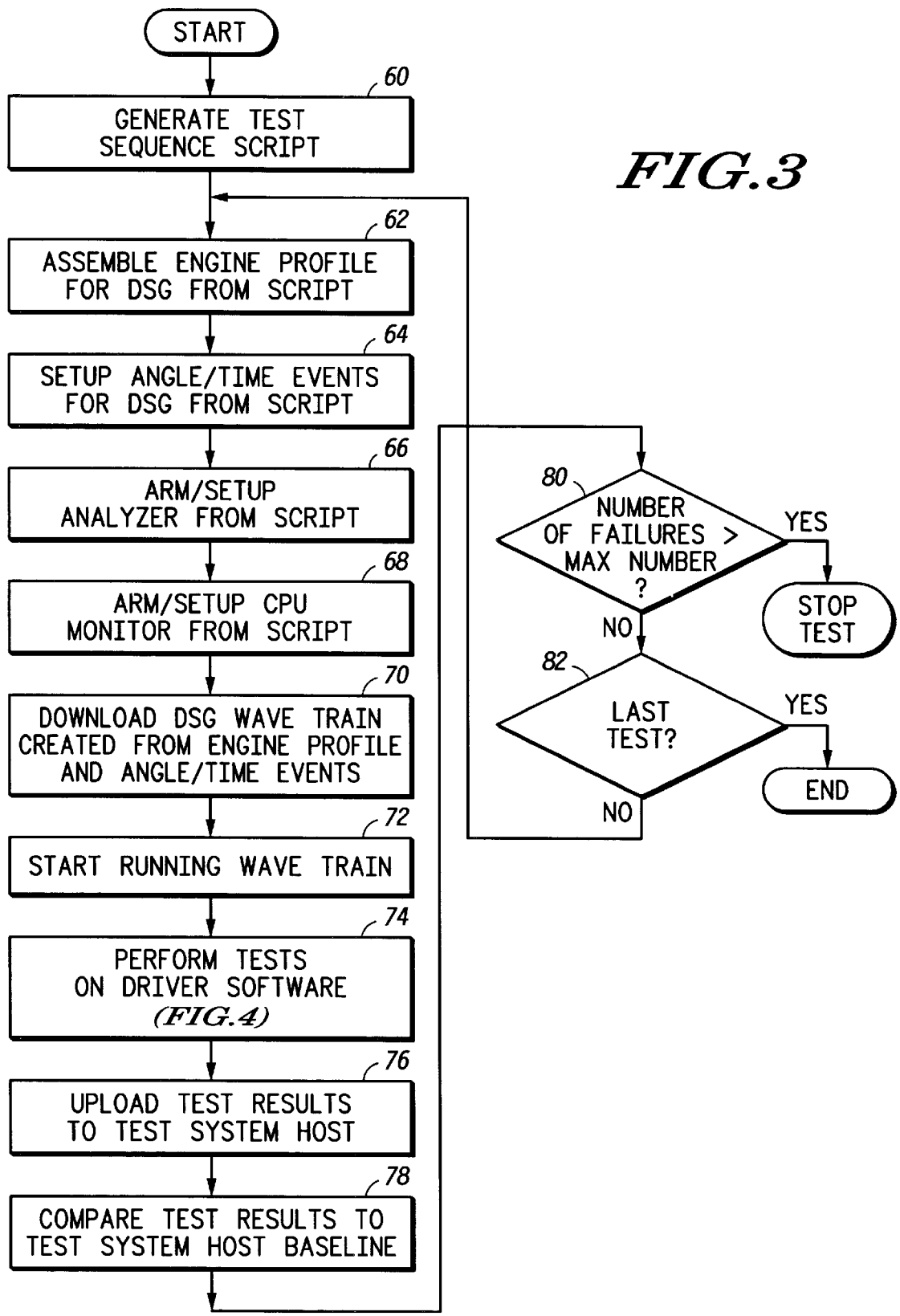
FIG. 3 illustrates, in flow diagram form, a method of implementing an automated test system in accordance with the present invention.

FIG. 3 illustrates, in flow diagram form, a method for implementing the present invention. The flow of FIG. 3 starts at step 60 with the generation of a test script. The test script is provided by a test engineer and specifies signals and events affecting the device under test. In addition, the script specifies events to be recorded during test, and associated trigger conditions. Specific commands associated with the script are discussed below. Steps 62, 64, 66, 68, and 78 are at least partially controlled by the test scripts.

Next, at step 62, a specific profile for an angle/time based system being emulated is read from the test script and converted to a format understandable by the digital signal generator (DSG) 16. For example, where a system driver for rotating machine, such as an internal combustion engine system, is being tested, the internal combustion engine profile would be specified, including such information as the position of teeth on a crankshaft wheel, the number of rotations per cycle, the number of cylinders, as well as any other engine specific information which would generally be static for terms of an emulation.

Next, at step 64, specific events for the DSG 16 are setup based on the script information. The events of step 64 are generally repetitive system events. As with the engine profile of step 62, this event information is compiled and assembled such that it is usable by the DSG 16. Examples of specific events would include providing pulses to represent events produced by the application software. This event information is input to the DUT 20 to emulate the operation of an angle/time base system. Next, at step 66, the pulse analyzer 22 is setup and armed based on the scripted information. In general, the pulse analyzer 22 is setup to store and record information when a specified trigger is encountered. In addition, the frequency at which information is recorded needs to be specified. Generally, the pulse analyzer 22 would be equivalent to a logic analyzer, or possibly a digital oscilloscope. The setup information is going to be determined upon the exact functionality being tested at a given point in time.

Next, at step 68, the CPU monitor is setup and armed based on the script. The CPU monitor consists of code segments which are executed upon an interrupt to emulate an application function. For example, if it is desirable to emulate the effect of changing a fuel pulse width asynchronously during an acceleration cycle, a CPU monitor code segment would be specified that executes when a specific external angle/time event interrupt occurs. Upon recognizing the interrupt, the code segment would emulate the specified event. Next, at step 70, the wavetrain specification generated for the digital signal generator 16 at steps 64, 66, and 68, are downloaded to the DSG 16. Next, at step 72, operation of the DSG 16 is begun by signaling the DSG 16 to start running the wavetrain.

As previously discussed, the pulse analyzer 22 and the CPU monitor within the device under test 20, are triggered based on the outputs from the DSG 16. Note that the DSG 16 in FIG. 1 is shown to provide test stimuli, external angle/time event interrupts, and angle/time analyzer triggers. The test stimuli would provide continuous motor events such as the pulse train created by recognition of the teeth on a crankshaft as discussed with reference to step 64.

This stimuli would change to reflect acceleration and deceleration of the engine. The external angle/time event interrupt is an asynchronous interrupt relative to the test stimuli, which causes an external interrupt to occur. The angle/time event interrupt signals would be received by an interrupt of the DUT 20. However, the angle/time event interrupt signals would generally represent any interrupt to the low level CPU driver or TPU microcode.

Next, at step 74, the specific tests specified in the script are performed on the DUT 20, and specifically on the driver software of DUT 20. Note that the driver software would include the TPU microcode as well as the CPU low level driver. With reference to FIG. 2, the driver software would reside in the TPU ROM 40, or the TPU RAM 44 when selected, as well as possibly in the ROM 46 or the CPU RAM 48. Note that the driver software is the low level driver and the TPU microcode being tested by the system. The specifics of step 74 are described in more detail with reference to FIG. 4.

Next, at step 76, following the completion of the driver software tests, the results are uploaded to the system host. These test results include the information from the pulse analyzer 22, as well as any information obtained from the CPU monitor executed within the DUT 20. This test result information is uploaded through the analyzer bus and test fixture bus respectively. Next, at step 78, the test results are compared to a test system host baseline specified in the script. Note that the test system host baseline is predetermined and provided as part of the script. However, for a first pass through a test script, the information uploaded from step 76 will generally need to be analyzed by a test engineer to determine whether or not it provides an adequate baseline. Once an adequate baseline is provided, it would be indicated in the script, and further comparisons done automatically at step 78 to determine whether or not the driver software and the device under test 20 is operating properly.

Next, at step 80, a determination is made whether or not a specified number of failures has been exceeded.

If the maximum number of failures has been exceeded, flow stops.

If the maximum number of failures has not been exceeded, the flow continues at step 82, where a further determination is made whether or not a last test has been executed. Following a last test, the flow ends. Where a final test has not been executed, flow proceeds back to step 62 where the information contained in the test script is further analyzed for further tests.

Figure 4:
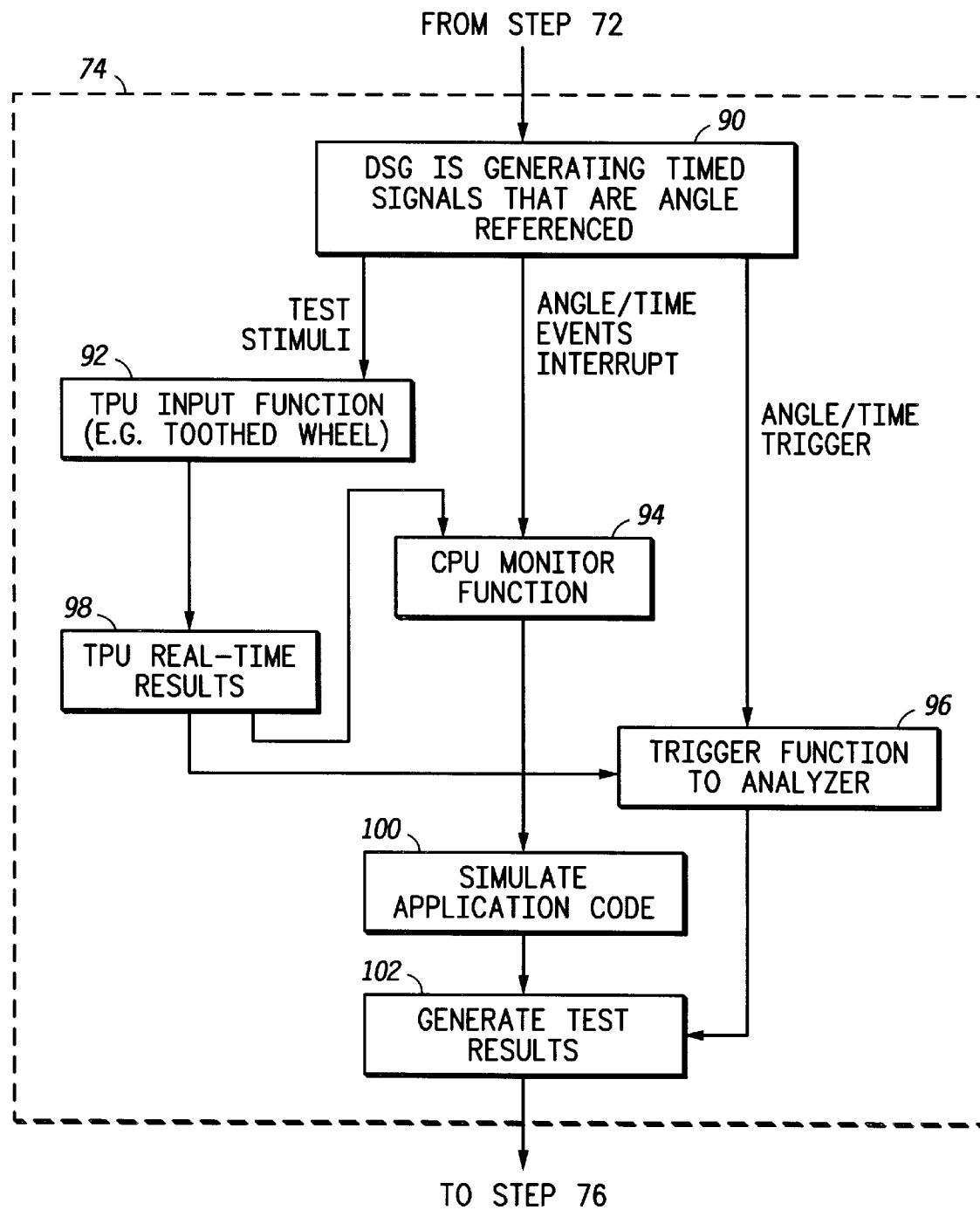
FIG. 4 illustrates, in flow diagram form, a more detailed view of the step in FIG. 3 that refers to performing tests on the driver software.

FIG. 4 illustrates in greater detail the step 74 of the method of FIG. 3. Step 72 initializes the generation of information from the DSG 16. Next, at step 90, the DSG 16 generates angle referenced time signals. Note that there are three such time signals generated, as indicated in the flow of FIG. 4. The first being a test stimuli. Test stimuli provides information directly to a TPU input function. As previously discussed, such a stimuli would include a wave form generated by a toothed portion of a crankshaft, as indicated in step 92. Next, at step 98, based on the input received, the TPU generates real-time results. Next, at step 96, the TPU real-time results are monitored to determine whether to trigger other functions such as functions by the analyzer or CPU monitor. Next, following the trigger function, test results are generated at a step 102.

Returning to step 90, the events for the external angle/time interrupts can be followed. Based on a signal from the DSG 16 and the TPU real-time results from step 98, the DUT 20 is interrupted such that a CPU monitor function is executed, as illustrated at step 94. The CPU monitor function executes a stub of code to cause the DUT 20 to simulate actual application code (step 100) that could be expected in normal operations. Flow proceeds to step 102, where, as previously discussed, the test results are stored. Note that the test results from the CPU monitor function would generally be stored in RAM and from the fixture 18 and the DUT 20 after the tests are completed.

Returning to step 90 an angle/time event trigger generated by the digital signal generator can be analyzed. By having the DSG 16 generate an angle/time trigger the analyzer is triggered directly in order to initiate an storage sequence at step 96. Subsequently, the stored results would be loaded to the host at step 76.

In order to more fully appreciate the present invention an understanding of some of the basic script commands is in order. The individual script commands are used by a test engineer in order to specify a test or sequence of tests desired to be performed. As previously discussed, the script commands are interpreted by the test system host 12 which in turn compiles and derives information in a format appropriate to drive the DSG 16, the test fixture 18, and the pulse analyzer 22. These commands can be generally thought of as test management commands and are setup to be used for overall test control. The following is an outline of the kind of user interface facilities that are offered within a test script. It should be noted that a graphical user interface (GUI) can be used to implement the specific commands.

A stop condition command is used to set the condition for stopping a series of test programs. If the stop condition specifies to stop on a failure, it can specify the number of failures required prior to stopping. If the stop condition specifies an exception, the test will continue until the first instance of a specified return code is specified. If the stop condition specifies a user condition, the test will continue unless stopped by a user. In general, whenever the test is stopped the current test conditions are displayed. A continue command is used to restart a test sequence from a current test if stopped.

A run test command is used to cause the test script to open the indicated file and execute a specified range of tests within the file.

A set-up command is used to setup the DUT 20 by loading microcode and setting registers in accordance to the code in the named file.

A log command logs the execution of the test scripts and test results to a file. An append option could be specified in order to append the results to an existing file. A close command may be used to close the log file.

A compare command selects whether the output data is to be compared to a specific baseline.

A baseline command specifies that a save results command will write the results to a baseline file instead of the named file. When this option is specified, the compare command will be ignored.

The test command shall identify the test as all commands from this line to the end test command. Tests may be specified by integers or integer ranges, but all tests shall be executed in position order. The use of the test command allows a single script file to specify a number of different tests.

The reference angle command is used to establish a reference point for subsequent synchronization from the DSG 16. The specified angle refers to an offset from the zero angle defined in the DSG 16 control program. The general use of the reference angle will be used to define the start of test position of the angle. All subsequent event angles and times shall be referenced from this angle.

An angle event command specifies a name and an angle. The angle event command is used to define a synchronization of pulse to accrue on the DSG 16 output to the DUT 20 interrupted at the given angle after the reference angle.

The time event command provides a name parameter and a time parameter. The time event command causes a defined synchronization pulse to occur at the DSG 16 output to the DUT 20, at the given time specified by the time parameter after the reference angle. The physical characteristics of the pulse shall be compatible to DUT 20 requirements. An angle trigger command specifies an angle parameter. The angle trigger command shall cause a defined synchronization pulse to occur on a DSG 16 output to the pulse analyzer 22 at the specified angle after the reference angle. The physical characteristics of the pulse shall be compatible with the pulse analyzer trigger input requirements. Only one angle trigger or time trigger is accepted for each test. Note that in other embodiments multiple triggers could be accepted.

A time trigger command specifies a time parameter. The time trigger command causes a defined synchronization pulse to occur on the DSG 16 output to the pulse analyzer 22 at the specified time after the referenced angle. The physical characteristics of the pulse shall be compatible with the analyzer trigger input requirements. Only one angle trigger or time trigger shall be accepted for each test. However, other embodiments may require additional triggers.

The start engine command specifies an angle parameter. The start engine command initiates the digital signal pulse stream at the most recently set engine speed, with the signals starting at the specified angle of the camshaft (0° to 720°). The specified angle shall be used as a reference angle for further commands.

The accel rate command specifies an acceleration parameter and top speed parameter. The accel rate command establishes the rate at which a speed change occurs and a positive change is commanded. The acceleration shall continue until top speed is reached.

A decel rate command specifies a decel parameter and a slow speed parameter. The decel rate command establishes the rate at which a speed change shall occur when a negative change is commanded. The deceleration shall continue until slow speed is reached.

An engine speed command specifies an RPM (revolutions per minute) parameter. The engine speed command causes the input periodic signal to assume a periodically constant with the specified RPM. If this command is issued when the engine is stopped, the pulses shall begin after the next start engine command, and continue at the given RPM. If this command is issued while the engine is running, the engine shall make gradual change of the speed according to the most accel or decel command.

A speed change command specifies an angle parameter and a new RPM parameter. The speed change command specifies the beginning of a change of speed at a specified angle after the reference angle. The angle may be greater than 720°. More than one of these commands may be given before the start engine command is issued. This in effect allows queuing of the acceleration commands to the engine.

A scan rate command specifies a bit time parameter for analyzer 22. The scan rate command is used to establish a specified rate as indicated by the bit time parameter. The bit time parameter is assumed to be in nanoseconds. Smaller bit times offer higher resolution of the read signal, while larger bit times provide a longer read period. The specifics of these requirements are as specified by the specific pulse analyzer 22.

A trigger command specifies a channel parameter, and a sensitivity parameter indicating rise, fall, or either. The trigger command establishes the channel and the sense of the trigger for the analyzer.

An on command specifies a named parameter. The on command sets the start of a series of instructions to be executed by the DUT 20 when interrupted by the specified named event. One on event command sequence should be defined for each angle or time event. Extra events shall return an error code and abort the test. Unused event blocks shall be ignored. All events can be assumed to be defined and executed in the order written. Likewise, an end on event command specifies a named parameter. The end on event command terminates the list of commands for the CPU to be executed on the named event.

A start test command specifies a time-out parameter. The start test command arms the pulse analyzer 22 and start the DSG 16 inputs. The test continues until the specified time-out, or until the analyzer buffer is full, whichever occurs first. The time-out may be implemented in the test system host 12, and is used only to terminate the test. In this implementation, the time-out is the only test termination required.

A tolerance command assigns a percentage error tolerance allowed to named entities compared between a baseline and results file. These tolerances are used whenever a compare results command is used.

A compare results command specifies a baseline parameter. The compare results command executes a compare program for checking the test output with the corresponding test results and the baseline as specified. The results of the comparison are returned to the test system host 12. If the files compare within the given times, the test shall be considered to have passed.

An end test command specifies a number parameter. The end test command closes all files and clears all temporary data and returns a value to the test system host 12 indicating pass, fail, or other error condition.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

What is claimed is:

1. A test system for testing software used in an angle/time based system, the test system comprising:

a test system host having test system host software for executing a test sequence script, the test sequence script for controlling setup, execution, and analysis of the software of the angle/time based system;

a digital signal generator, coupled to the test system host and the angle/time based system, for generating, under control of the test sequence script, test stimuli and test sequencing to test the software of the angle/time based system;

a device under test having a central processing unit and a time processing unit, coupled to the test system host and to the digital signal generator, which executes the software of the angle/time based system, wherein the angle/time based system is for determining a position of a rotating machine; and a pulse analyzer, coupled to the test system host, the digital signal generator, and to the device under test, the pulse analyzer for receiving and processing test results, and for providing the test results to the test system host for analysis.

2. The test system of claim 1, wherein the device under test further comprises monitor software for simulating an interface between an application software and the software of the angle/time based system, wherein the monitor software is for running on the central processing unit.

3. The test system of claim 1, wherein the test sequence script includes assembling a rotating machine profile for controlling the test stimuli provided by the digital signal generator during testing of the software of the angle/time based system.

4. The test system of claim 1, wherein the test sequence script includes providing angle/time events to the central processing unit for triggering a central processing unit monitor function by the digital signal generator.

5. The test system of claim 1, wherein the test sequence script includes arm/setup information for the pulse analyzer.

6. The test system of claim 1, wherein the testing occurs in real-time without intervention from the test system host during testing.

7. The test system of claim 1, wherein the test system host software is for emulating a system operation environment for a rotating machine.

8. A method for testing software of an angle/time based system, the method comprising the steps of:

generating a test sequence script using a test system host;

generating a digital signal generator wavetrain using the test sequence script;

providing the wavetrain to a device-under-test having a time processing unit, the wavetrain for real-time testing of driver software of the time processing unit, wherein the time processing unit is for determining a position of a rotating machine;

providing test results of the real-time testing to the test system host; and analyzing the test results using a pulse analyzer and the test system host.

9. The method of claim 8, wherein the step of generating the digital signal generator wavetrain comprises:

assembling a rotating machine profile for use by a digital signal generator from the script;

setting up an angle/time event for use by the digital signal generator from the script;

setting up and arming the analyzer from the script; and setting up a central processing unit monitor from the script.

10. The method of claim 8, wherein the step of providing the wavetrain to a device-under-test further comprises:

generating timed signals that are angle referenced, where the timed signals are for simulating actual signals from a rotating wheel using a digital signal generator;

providing the timed signals for a time processing unit input function and angle/time event interrupts for a central processing unit monitor function; and creating test results from the timed signals and the central processing unit monitor function by operating the device-under-test in real-time.

11. The method of claim 8, wherein the step of analyzing the test results further comprises comparing the test results to baseline results.

12. The method of claim 8, wherein the method for testing is iterated until a predetermined number of tests are performed.

13. A method for real-time testing of angle/time based system software, the angle/time based system software being executed on an integrated circuit having a central processing unit and a time processing unit, the method comprising the steps of:

generating a test sequence script using a test system host;

loading time processing unit microcode to the time processing unit, the microcode for real-time processing of angle/time events, wherein the time processing unit is used to determine a position of a rotating machine;

loading interface software into the central processing unit, the interface software for interfacing the microcode to simulated application software;

generating a digital signal generator wavetrain using the test sequence script for the real-time testing of the microcode;

providing the wavetrain to the integrated circuit, the wavetrain for real-time testing of driver software of the time processing unit;

providing an interrupt for a central processing unit monitor function, wherein the monitor function simulates application software to produce the simulated application software and exercises the microcode and the interface software to generate output signals;

providing the output signals to the test system host; and analyzing the output signals using a pulse analyzer and the test system host to provide test results.

14. The method of claim 13, wherein the step of generating the digital signal generator wavetrain comprises:

assembling a rotating machine profile for use by a digital signal generator from the script;

setting up an angle/time event for use of the digital signal generator from the script;

setting up and arming the analyzer from the script; and setting up a central processing unit monitor from the script.

15. The method of claim 13, wherein the step of providing the wavetrain to the integrated circuit further comprises:

generating timed signals that are angle referenced, where the timed signals are for simulating actual signals from a rotating wheel using the digital signal generator;

providing the timed signals for a time processing unit input function and angle/time event interrupts for the central processing unit monitor function; and creating test results from the timed signals and the central processing unit monitor function by operating the integrated circuit in real-time.

16. The method of claim 13, wherein the step of analyzing the test results further comprises comparing the test results to baseline results.

17. The method of claim 13, wherein the method for testing is iterated until a predetermined number of tests are performed.

\* \* \* \* \*